US007788596B2

(12) United States Patent
Iwabuchi

(10) Patent No.: US 7,788,596 B2
(45) Date of Patent: Aug. 31, 2010

(54) IMAGE DISTRIBUTION SYSTEM AND CLIENT TERMINAL AND CONTROL METHOD THEREOF

(75) Inventor: Yoshitsugu Iwabuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 11/550,672

(22) Filed: Oct. 18, 2006

(65) Prior Publication Data

US 2007/0174489 A1 Jul. 26, 2007

(30) Foreign Application Priority Data

Oct. 28, 2005 (JP) ............................. 2005-314844
Aug. 11, 2006 (JP) ............................. 2006-220639

(51) Int. Cl.
*G06F 3/048* (2006.01)

(52) U.S. Cl. ....................... 715/800; 345/428; 345/619; 345/660; 345/661; 345/668

(58) Field of Classification Search ................. 715/700, 715/800; 348/36; 345/428, 619, 660, 661, 345/668
See application file for complete search history.

(56) References Cited

U.S. PATENT DOCUMENTS

| | | | | |
|---|---|---|---|---|
| 5,764,235 | A * | 6/1998 | Hunt et al. | 345/428 |
| 6,043,837 | A * | 3/2000 | Driscoll et al. | 348/36 |
| 6,166,712 | A | 12/2000 | Hoffman et al. | |
| 6,239,836 | B1 * | 5/2001 | Suzuki et al. | 348/211.3 |
| 6,281,874 | B1 * | 8/2001 | Sivan et al. | 345/660 |
| 6,457,057 | B1 | 9/2002 | Kageyu et al. | |
| 7,124,427 | B1 * | 10/2006 | Esbensen | 725/109 |
| 7,250,979 | B2 | 7/2007 | Choi | |
| 2002/0078172 | A1 * | 6/2002 | Yoshikai et al. | 709/218 |
| 2002/0103894 | A1 * | 8/2002 | Tanaka | 709/224 |
| 2006/0077262 | A1 * | 4/2006 | Miyamaki et al. | 348/211.99 |

FOREIGN PATENT DOCUMENTS

| | | | |
|---|---|---|---|
| CN | 1248022 | A | 3/2000 |
| EP | 1052598 | A2 * | 11/2000 |
| JP | 11-196379 | | 7/1999 |

(Continued)

OTHER PUBLICATIONS

Translation of Japanese Patent Application Laid Open No. 2005-191949 published Jul. 14, 2005.

(Continued)

*Primary Examiner*—Boris Pesin
*Assistant Examiner*—Shen Shiau
(74) *Attorney, Agent, or Firm*—Canon U.S.A., Inc. I.P. Division

(57) ABSTRACT

When a viewer resizes an image window while displaying image data distributed from a server on the image window of a client terminal, the client terminal notifies the server of the size of the image window after resizing. The server resizes the image data so that an image has the same size as that of the window, and transmits the resized image data to the client terminal. In this way, the need for the resizing processing in the client terminal can be obviated, thus reducing its load.

31 Claims, 17 Drawing Sheets

FOREIGN PATENT DOCUMENTS

| | | | |
|---|---|---|---|
| JP | 2005-191949 | A | 7/2005 |
| KR | 10-2003-0090350 | | 11/2003 |
| KR | 10-2004-0015965 | | 2/2004 |
| RU | 2 125 299 | C1 | 1/1999 |
| WO | 95/01626 | A1 | 1/1995 |

OTHER PUBLICATIONS

Russian Office Action dated Dec. 21, 2007; concerning Russian Patent Application No. 2006137998 and translation.

Notice of Allowance dated Jan. 15, 2008 concerning application No. 10-2006-0104810.

* cited by examiner

F I G. 4A
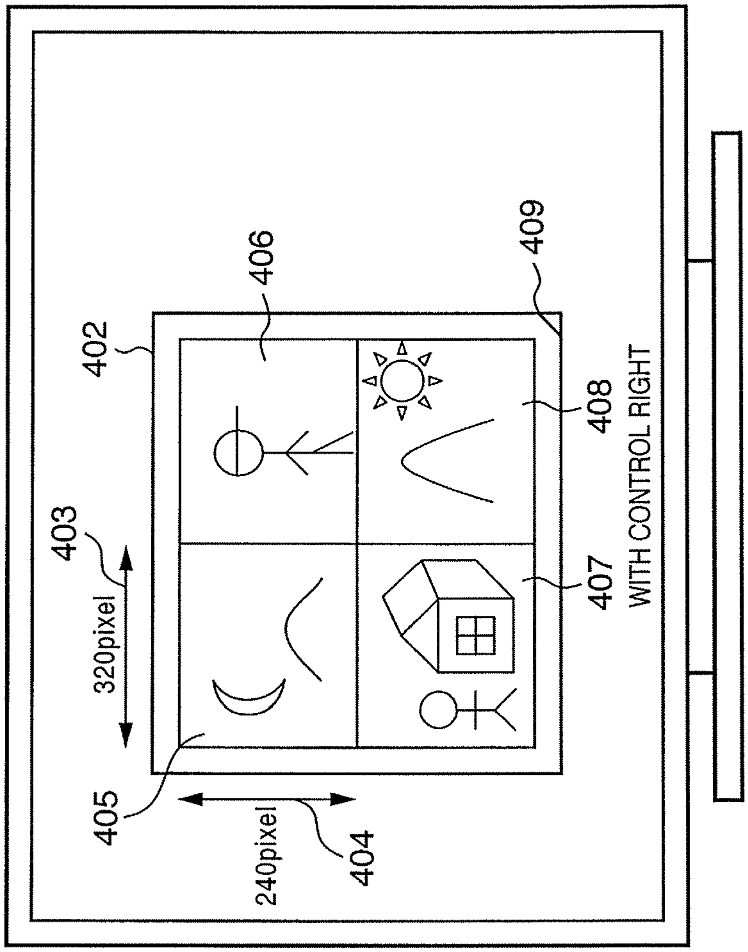

FIG. 9

| DISPLAY SIZE (PIXEL) D (901) | RESIZING (902) | AMOUNT OF LOAD L (903) |
|---|---|---|
| 640 × 480 < D | NECESSARY | 64 |
| 640 × 480 = D | NOT NECESSARY | 32 |
| 640 × 480 > D > 320 × 240 | NECESSARY | 48 |
| 320 × 240 = D | NOT NECESSARY | 8 |
| 320 × 240 > D > 160 × 120 | NECESSARY | 12 |
| 160 × 120 = D | NOT NECESSARY | 2 |
| 160 × 120 > D | NECESSARY | 3 |

FIG. 12

| OPERATION MODE (1201) | RESIZE STATE OF WINDOW (1202) | EXECUTION OF RESIZING PROCESSING (1203) | | |
|---|---|---|---|---|
| | | SERVER | CLIENT TERMINAL | |
| IMAGE QUALITY ORIENTED MODE | ENLARGE | OK | NG | 1210 |
| | REDUCE | NG | OK | 1211 |
| MOTION ORIENTED MODE | ENLARGE | NG | OK | 1212 |
| | REDUCE | OK | NG | 1213 |

FIG. 14

| | ITEM | SETTING OF CLIENT TERMINAL | EXECUTION OF RESIZING PROCESSING | |
|---|---|---|---|---|
| | | | SERVER | CLIENT TERMINAL |
| 1401 | LINE | FTTH CONNECTION | OK | NG |
| | | PPP CONNECTION | NG | OK |
| 1402 | PERFORMANCE | POWER SAVING MODE | OK | NG |
| | | NORMAL MODE | NG | OK |
| 1403 | MODEL | CELLULAR PHONE | OK | NG |
| | | HIGH-PERFORMANCE PERSONAL COMPUTER | NG | OK |
| 1404 | FUNCTION | RECORDING | OK | NG |
| | | NOT RECORDING | NG | OK |
| 1405 | QUALITY | IMAGE QUALITY ORIENTED MODE | OK | NG |
| | | MOTION ORIENTED MODE | NG | OK |

IMAGE DISTRIBUTION SYSTEM AND CLIENT TERMINAL AND CONTROL METHOD THEREOF

BACKGROUND OF THE INVENTION

1. Field of the Invention

The present invention relates to an image distribution system which distributes image data from a server via a network, a client terminal, and a control method thereof.

2. Description of the Related Art

In recent years, an image distribution system which distributes captured image data from a server to a client terminal has prevailed. In such a system, the server comprises, e.g., a network camera, and the client terminal comprises a computer. Such an image distribution system is used especially for the purpose of surveillance of specific places by utilizing a feature of display images from cameras arranged at a plurality of remote places.

Upon making surveillance based on images, images from a large number of servers must be simultaneously displayed on a display of the client terminal. Hence, the images from the servers are respectively displayed in reduced windows on the display. If a particular image is selected, the window of that image can be displayed in an enlarged size. The size of the window is changed by enlarging or reducing the window size of an application that displays the image. More specifically, a user often enlarges or reduces the window size to a desired size by dragging a window frame displayed by the application with a mouse.

On the other hand, each server transmits captured image data at a resolution which is set in advance to the client terminal. A server which can change this resolution in response to a request from the client terminal is commercially available. For example, a watcher can select and set one of resolutions of 640×480 (pixels) and 320×240 (pixels) in the server, and can receive and display image data which is transmitted at the set resolution. The resolution in the server can be easily changed by halving number of pixels to be sampled if that resolution is ½ the maximum resolution of the image data (see Japanese Patent Laid-Open No. 11-196379).

Therefore, as the resolution provided by the server, a standard resolution, for example, a VGA size (640×480 (pixels)), of a computer or image media is set as a maximum resolution. Then, the server normally provides a QVGA size (320×240 (pixels)) ½ the VGA size, and a QQVGA size (160×120 (pixels)) ½ the QVGA size. However, the following configuration may also be adopted. That is, an image is captured using a high-resolution CCD in advance and an image area according to an arbitrary resolution is transmitted, or when resolution conversion is made using a high-speed image processing LSI, the resolution of an image to be transmitted from the server can be changed to an arbitrary resolution other than the prescribed values.

Upon displaying image data distributed from the server on the client terminal, when the client terminal changes the image window to an arbitrary size, it executes resizing processing for changing the rendering size. For example, upon displaying an image which is distributed from the server and has a resolution of 640×480 (pixels), the size of the window that displays the image is reduced at a client terminal. In this case, the client terminal executes the resizing processing from the resolution of 640×480 (pixels) to that of, e.g., 500×300 (pixels) in accordance with the size of the reduced window.

In such resizing processing at the client terminal, since the interpolation processing and re-sampling processing between neighboring pixels are executed upon image display, a heavy load is imposed on the processing at the client terminal. Especially, when the client terminal connects a large number of servers and displays a large number of images from the servers, and when it simultaneously applies resizing processing to these pictures, the load on the client terminal increases significantly. Such load increase results in a drop in frame rate upon displaying an image, and a drop in processing speed of the computer. That is, the load of the resizing processing according to various image qualities required by the watcher or the operation states of various supervising apparatuses used by the watcher cannot be reduced.

Enlarged-scale display by means of the interpolation processing based on neighboring pixels in the client terminal cannot obtain an optimal image quality according to the window size. For example, when an image window that displays image data of 160×120 (pixels) is enlarged to 640×480 (pixels), since data before resize is enlarged four times in the vertical and horizontal directions, the image quality deteriorates.

SUMMARY OF THE INVENTION

The object of the present invention is to solve the conventional problems.

A characteristic feature of the present invention is to provide an image distribution system which can reduce the load of image resizing processing on a client terminal, a client terminal, and a control method thereof.

A characteristic feature of the present invention is to provide an image distribution system which can prevent deterioration in quality of an image due to enlargement at a client terminal, a client terminal, and a control method thereof.

A characteristic feature of the present invention is to provide an image distribution system which allows the user to select a resizing method corresponding to the operation states of a client terminal and server, and the operation environment of the system, a client terminal, and a control method thereof.

According to the present invention, there is provided an image distribution system for transmitting image data captured at a predetermined resolution from a server to a client terminal, and displaying the image data on the client terminal, wherein the client terminal comprises:

a notification unit configured to notify the server of size information of a window which displays the image data and whose size has been changed in accordance with a size change instruction; and a display control unit configured to control to display the image data received from the server on the window, the server comprises:

a resizing unit configured to change a resolution upon capturing the image data based on the size information, wherein the display control unit of the client terminal receives the image data resized by the resizing unit and displays the received image data on the window.

Further, according to the present invention, there is provided a client terminal for receiving image data captured at a predetermined resolution from a server, and displaying the received image data on a window, comprising:

a notification unit configured to notify the server of size information of a window which displays the image data and a size of which has been changed in accordance with a size change instruction; and a display control unit configured to receive the image data resized by the server, and displaying the resized image data on the window.

Further, according to the present invention, there is provided a method of controlling an image distribution system for transmitting image data captured at a predetermined resolution from a server to a client terminal, and displaying the image data on the client terminal, comprising:

an input step of inputting a change instruction of a size of a window which displays the image data;

a notification step of notifying the server of size information of the window the size of which has been changed in accordance with a size change instruction;

a resizing step of changing a resolution upon capturing the image data based on the size information; and a display control step of receiving the image data resized in the resizing step and displaying the resized image data on the window.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B depict views illustrating windows displayed on the display of the client terminal according to a second embodiment;

FIG. 9 depicts an example of a table obtained by numerically converting the amounts of load on a client terminal according to the third embodiment;

FIG. 12 depicts an example of a table for explaining the relationship among the operation mode, the window resize state, and the resizing processing according to the fourth embodiment;

FIG. 14 depicts an example of a table for explaining the relationship between the setting items of the client terminal and resizing processing according to the fifth embodiment.

DESCRIPTION OF THE EMBODIMENTS

Preferred embodiments of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

First Embodiment

The first embodiment of the present invention will be described in detail below with reference to FIGS. 1 to 3.

Figure 1:
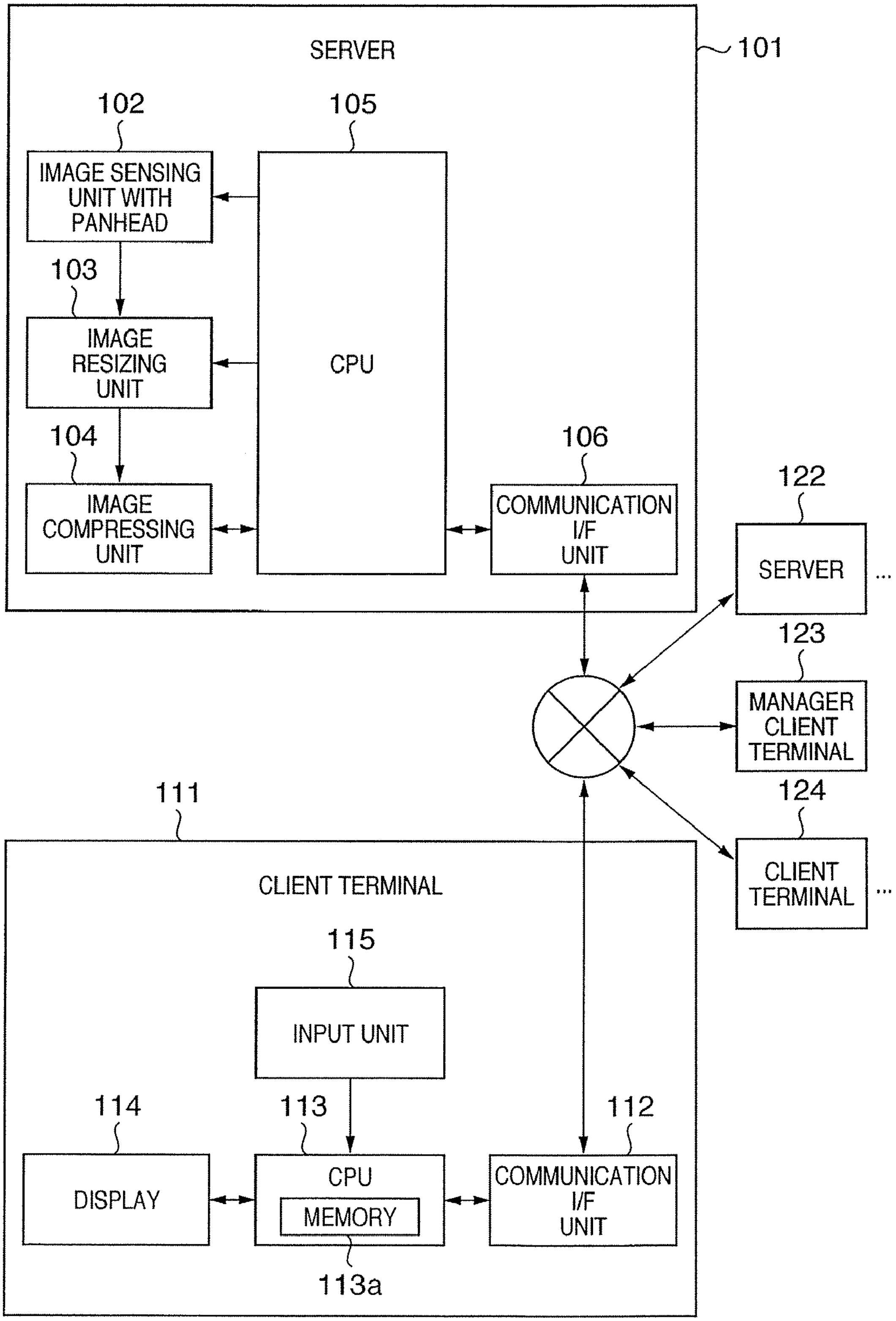
FIG. 1 is a block diagram for explaining the overall system arrangement of an image distribution system according to a first embodiment of the present invention.

FIG. 1 is a block diagram for explaining the overall system arrangement of an image distribution system according to the first embodiment of the present invention. Building components of the system will be described first.

A server 101 is configured as a network camera used to capture an image of an object, and distributes an image captured by that camera via a network 121. A client terminal 111 is a computer which receives and displays image data sent from the server 101. These server 101 and client terminal 111 are connected to the network 121 such as a LAN, the Internet, or the like. By connecting a plurality of servers 122 to the network 121, the client terminal 111 can simultaneously display a plurality of items of image data from the plurality of servers 122 at remote places on multi-windows and the like. By connecting a plurality of client terminals 124 to the network 121, image data can be distributed without limiting viewers. A manager client terminal 123 is a manager of the server 101 that has the camera control rights to be able to make pan and tilt operations of a panhead of the network camera and various settings of the camera.

The server 101 according to this embodiment will be described below.

The server 101 comprises an image sensing unit 102 with a panhead, an image resizing unit 103, an image compressing unit 104, a CPU 105, and a communication interface (I/F) unit 106. The image sensing unit 102 with a panhead executes pan and tilt drive operations of a panhead in accordance with control commands from the manager client terminal 123. As a result, the image sensing unit 102 with a panhead can capture an image with a desired angle. The image sensing unit 102 with a panhead receives these camera control commands from the manager client terminal 123 via the CPU 105. The image resizing unit 103 captures image data, and converts the captured image data to a resolution which is set in advance. That is, resizing of this embodiment includes processing for changing the resolution (size) of image data. In this embodiment, the resolution of an image provided from the server 101 to the client terminal includes three different resolutions, i.e., 640×480 (pixels), 320×240 (pixels), and 160×120 (pixels). The resolution can be changed according to a command from the client terminal, and the image resizing unit 103 receives such change command via the CPU 105. The image compressing unit 104 compresses image data of three different resolutions captured by the image resizing unit 103 in, e.g., a JPEG format or the like. The CPU 105 converts the three types of compressed data into a multi-stream. The communication I/F unit 106 distributes these image data to the client terminals 111 and 124 connected to the network 121.

The client terminal 111 according to this embodiment will be described below. Note that each client terminal 124 has the same arrangement.

The client terminal 111 comprises a communication I/F unit 112, a CPU 113, a display 114, and an input unit 115. The input unit 115 is an input device such as a mouse and keyboard, and is used to control an application, to input and transmit control commands to the server 101, and so forth. The communication I/F unit 112 receives the image data of the three different resolutions transmitted from the server 101, and sends them to the CPU 113. The CPU 113 decompresses the image data of the display resolution set in this client terminal, and displays an image on the display 114 via application software.

Figure 2A:
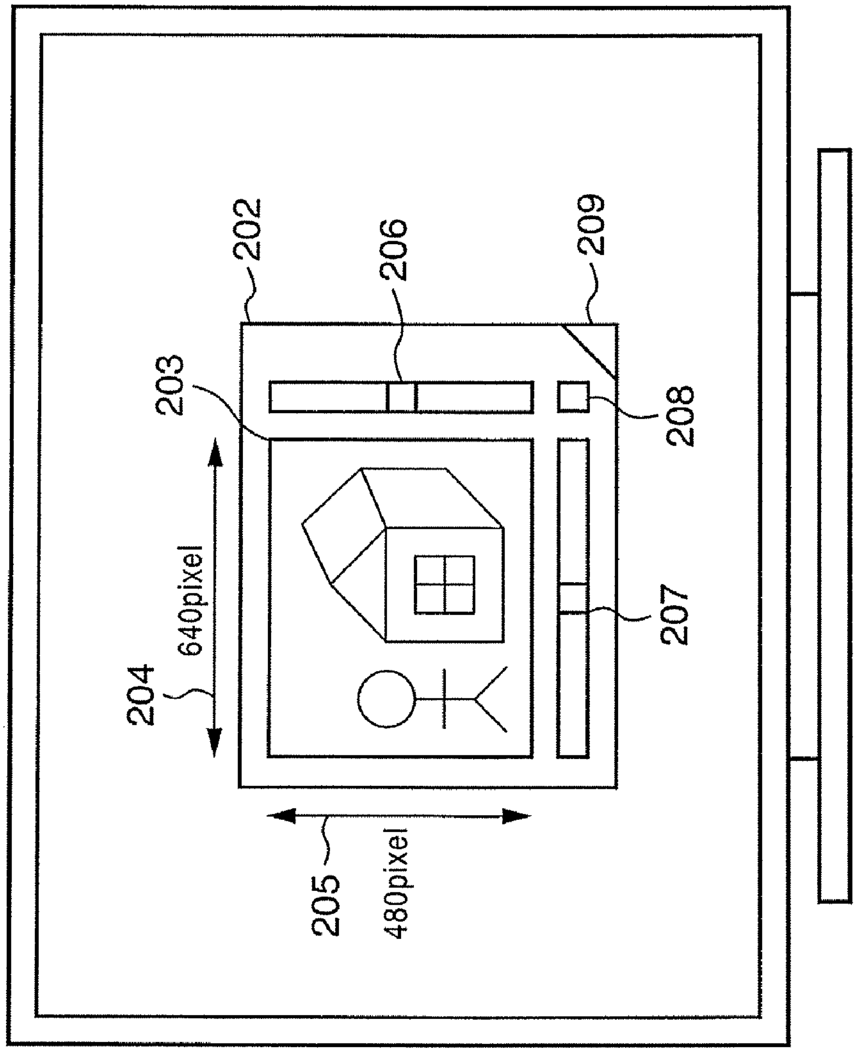
FIGS. 2A and 2B depict views illustrating windows displayed on a display of a client terminal according to the first embodiment.
Figure 2B:
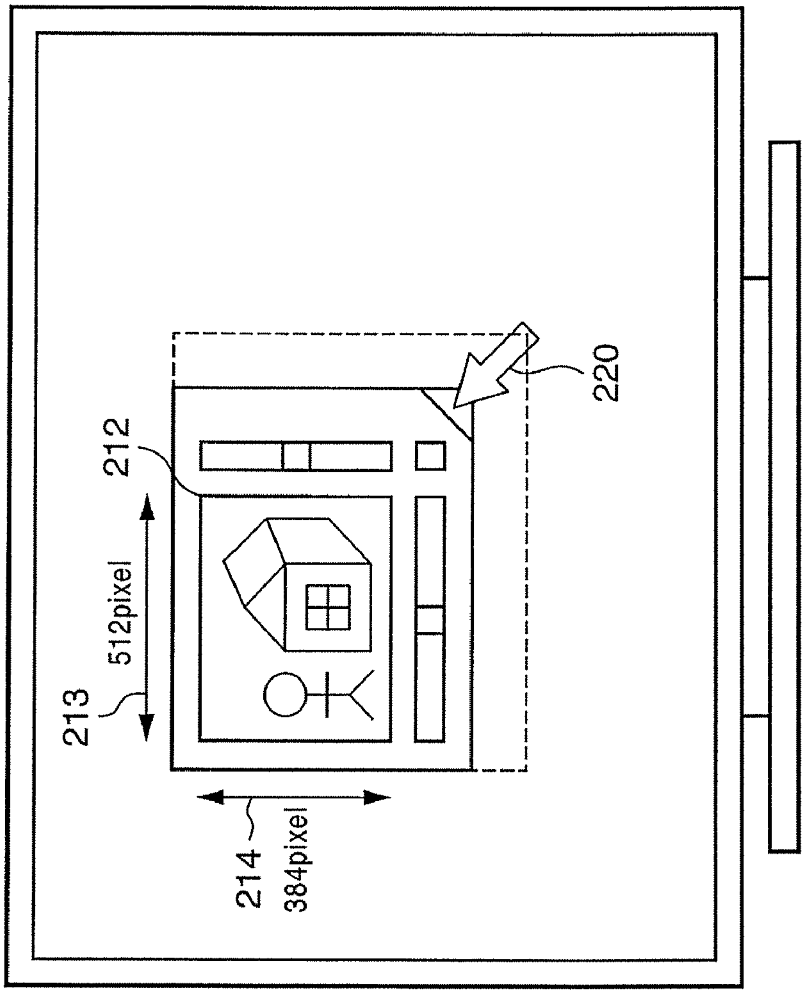

FIGS. 2A and 2B illustrate windows displayed on the display 114 of the client terminal according to this embodiment, and show a state wherein image data distributed from the server 101 is displayed. Resizing of the image window will be described below.

FIG. 2A shows the display contents on the display 114 before resizing, and reference numeral 202 denotes a window displayed by the application. On this window 202, reference numeral 203 denotes an image window as an area for displaying an image. In this case, the client terminal 111 receives image data of a resolution of 640×480 (pixels). Hence, this image is displayed to have a size of 640 (pixels) in a horizontal direction 204 and 480 (pixels) in a vertical direction 205. Reference numeral 206 denotes a tilt-control bar; and reference numeral 207 denotes a pan-control bar. By sliding these bars, the pan and tilt angles of the panhead of the image sensing unit 102 with a panhead of the server 101 can be remotely controlled. With this control, the client terminal 111 can view an image obtained by capturing an image of an object with a desired angle. The client terminal that acquires the rights to control a camera can use these camera control tool bars by pressing a control right button 208.

This control right button 208 is enabled when the user selects this button while other client terminals do not acquire the control rights, and is used to limit users so as to inhibit a plurality of client terminals from simultaneously operating a single camera. Reference numeral 209 denotes a drag area. When the user drags this area 209 using the mouse, he or she can change (resize) the size of the display window 202 and image window 203 by the application to an arbitrary size.

FIG. 2B shows the display contents on the display 114 after the size of the window 202 is changed by dragging of the mouse using a cursor 220. The image window 203 is resized in accordance with this dragging, as denoted by reference numeral 212, and is displayed in a reduced size of 512 (pixels) in a horizontal direction 213 and 384 (pixels) in a vertical direction 214.

As a result of the resize operation of the image window on the client terminal 111, the image with a size different from the resolution of the image transmitted from the server 101 must be displayed. For this reason, the load of re-sampling processing or interpolation processing is imposed on the client terminal 111. In order to reduce such load on the client terminal 111, it is effective to display an image with the same size as the resolution of the received image from the server 101. For this purpose, the server 101 must provide image data with a resolution corresponding to the resized window size on the client terminal 111.

In the first embodiment, in a case that the size of the window to be displayed is changed in the client terminal, the client terminal sends information associated with the changed display size to the server 101. Based on this information, the server 101 changes the resolution of a captured image by the image resizing unit 103 to have a resolution corresponding to that display size, and transmits image data whose resolution is changed in this way to the client terminal. In this manner, the load of the resizing processing on the client terminal can be reduced. Further, since the image sensing side (server) executes resizing of an image, deterioration of an image upon resizing can be prevented.

Figure 3:
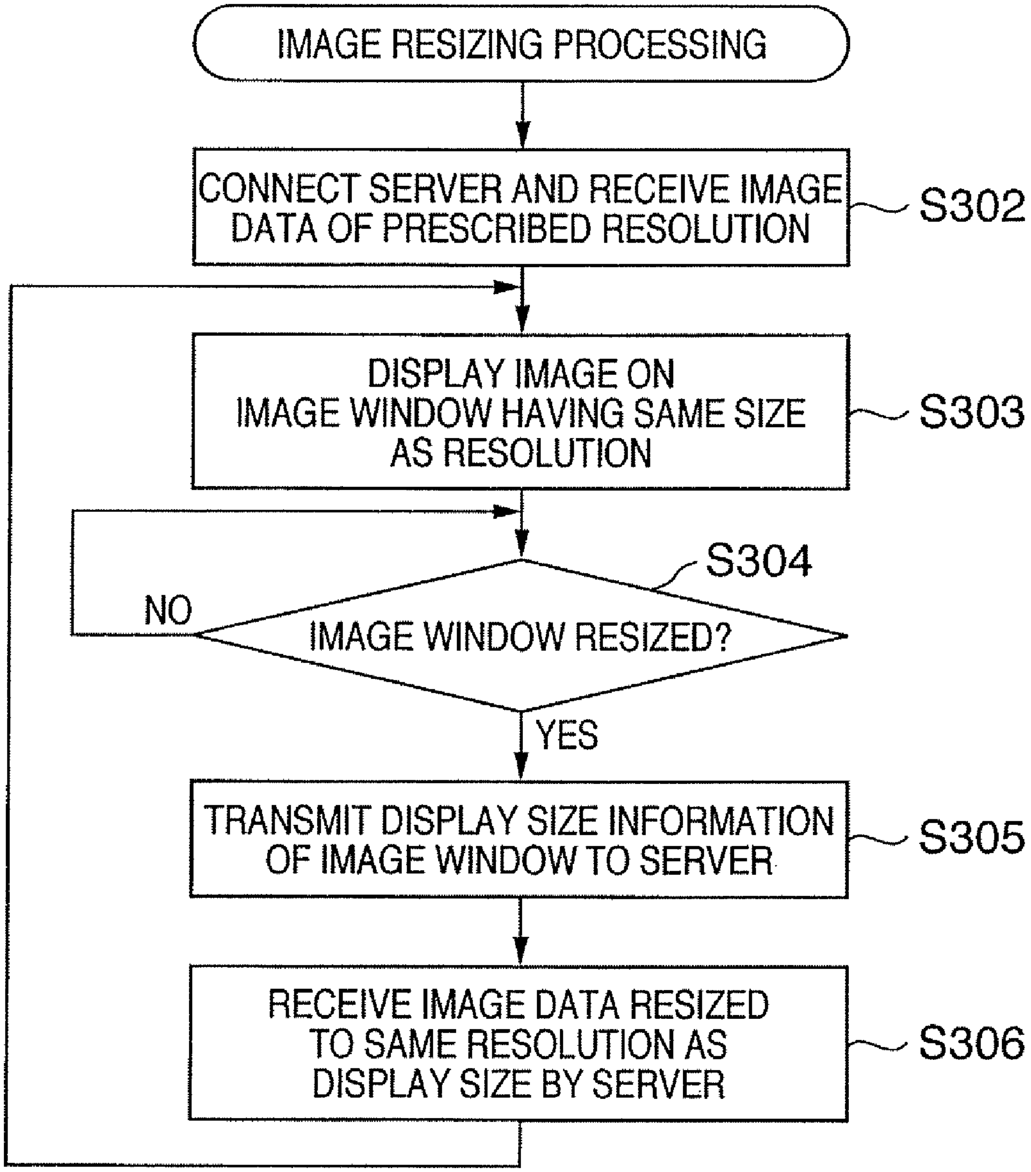
FIG. 3 is a flowchart for explaining the processing in the client terminal according to the first embodiment of the present invention.

FIG. 3 is a flowchart for explaining the processing in the client terminal upon executing the resizing processing according to the first embodiment. FIG. 3 depicts the processing of the client terminal upon executing the resizing processing of the window shown in FIG. 2B. Note that a program which implements this processing is stored in a memory 113*a* of the CPU 113, and is executed under the control of the CPU 113.

In step S302, the CPU 113 connects the server 101 and receives image data of the prescribed resolution. In the first embodiment, the CPU 113 receives image data of a resolution of 640×480 (pixels). In step S303, the CPU 113 launches an application to display an image on the image window 203 to have the original resolution (640×480 (pixels)) (FIG. 2A). The CPU 113 determines in step S304 whether or not a user resizes the image window. If the user resizes the image window, the process advances to step S305, and the CPU 113 transmits the display size information of the image window 212 after resizing to the server 101 via the communication I/F unit 112. In the first embodiment, assume that the size of the image window 212 after resizing is 512 (pixels) in the horizontal direction×384 (pixels) in the vertical direction, as shown in FIG. 2B.

In this way, the client terminal transmits the display size information indicating 512×384 (pixels) to the server 101 in step S305. Based on this received display size information, the server 101 changes the image sensing size (resolution) from 640×480 (pixels) to 512×384 (pixels), and transmits image data captured at that resolution to the client terminal 111. In step S306, the client terminal 111 displays the received image stream transmitted from the server 101 as the image data of 512×384 (pixels).

As described above, according to the first embodiment, when the display size of the image window on the client terminal is changed from, e.g., 640×480 (pixels) to 512×384 (pixels), the client terminal transmits the display size information of the image window after resizing to the server 101. Based on this information, the server 101 can capture an image at a resolution of 512×384 (pixels), and can transmit the captured image data to the client terminal 111. Therefore, upon displaying an image on the client terminal, the need for interpolation processing and re-sampling processing for resizing can be obviated, and the load of the resizing processing on the client terminal can be reduced.

Since the size of the image window on the client terminal corresponds to the resolution of image data transmitted from the server 101, the image quality does not suffer any deterioration due to resizing of the display window.

The first embodiment has exemplified the method of dragging the mouse on the client terminal as the resizing method of the image window. However, the present invention is not limited to this, and various other resizing methods may be used. For example, resizing based on the numerical values of the window size designated from the keyboard, resizing according to prior setting conditions to have a scheduling event, an external sensor event, or the like as a trigger, and the like may be used.

The first embodiment has explained a case wherein the size of the image window is reduced. However, the present invention is not limited to this, and can be similarly applied to a case wherein the size of the image window is enlarged.

Second Embodiment

The second embodiment of the present invention will be described in detail hereinafter with reference to FIGS. 4A and 4B and FIG. 5. Note that the hardware arrangements of the distribution system, server (network camera), and client terminal are the same as those of the first embodiment, and a description thereof will be omitted.

Figure 4B:
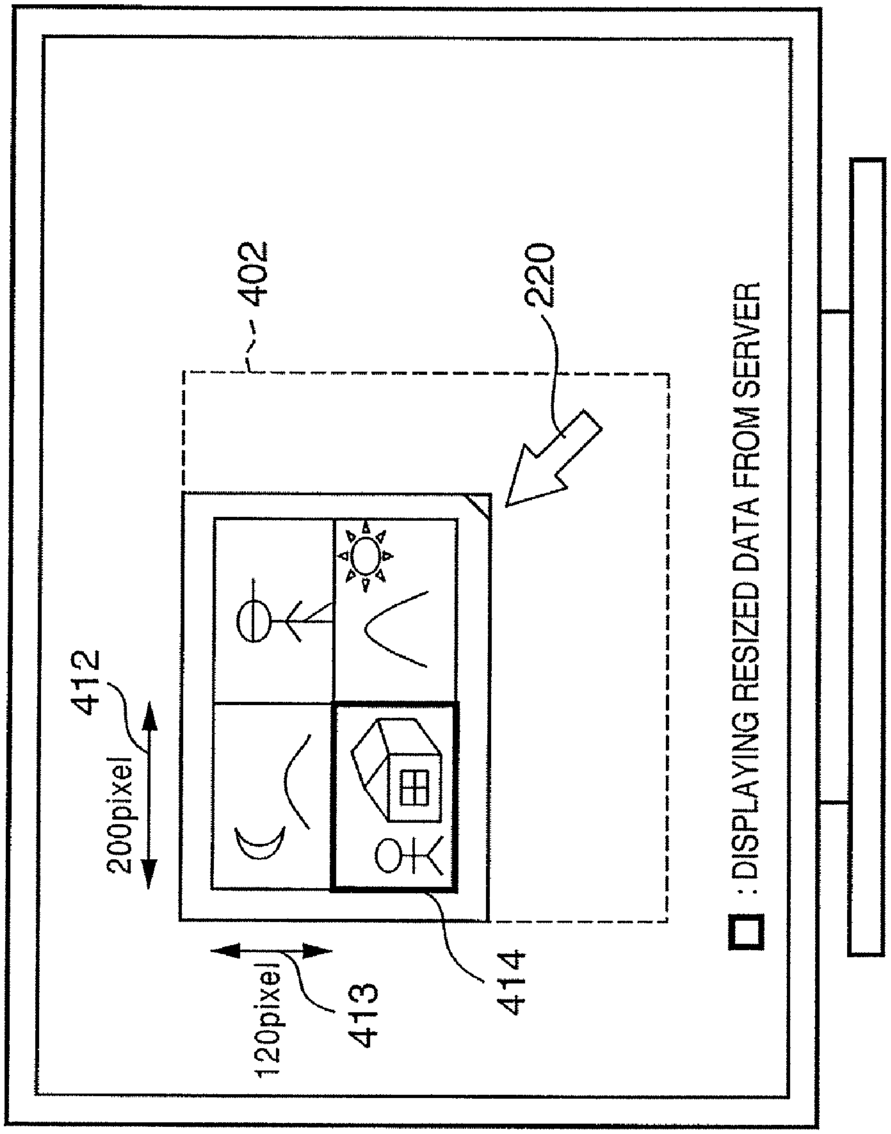

FIGS. 4A and 4B illustrate windows displayed on the display 114 of the client terminal according to the second embodiment. Each of FIGS. 4A and 4B simultaneously displays image data at four places distributed from four servers. Resizing of the image window will be described below.

FIG. 4A shows the display state on the display 114 before resizing. Reference numeral 402 denotes a window displayed by the application. On this window 402, reference numerals 405 to 408 denote image windows which respectively display captured images from four servers (not shown). The client terminal according to the second embodiment displays image data of a resolution of 320×240 (pixels) distributed from the respective servers. Hence, the size in a horizontal direction 403 of each image is 320 (pixels), and that in a vertical direction 404 is 240 (pixels). Assume that the client terminal has acquired the camera control rights of, e.g., the third server (image window 407).

Reference numeral 409 denotes a drag area. When a user drags a frame of this area 409 using the mouse, the user can change the sizes of this window 402 and the image windows 405 to 408 to arbitrary sizes.

FIG. 4B shows the display contents on the display 114 after the size of the window 402 is reduced by dragging the mouse. According to this operation, the image windows 405 to 408 are resized (reduced), and each window is displayed to have a size of 200 (pixels) in a horizontal direction 412×120 (pixels) in a vertical direction 413.

As described above, in order to reduce the load on the resizing processing the image window in the client terminal, it is effective to generate and distribute image data of a resolution corresponding to the size of the image window by the server 101. However, when a plurality of client terminals receive an image from the server 101 and only one client terminal takes the liberty to change the image sensing resolution of the server 101, the following problems are posed. That is, the image quality of an image displayed on other client terminals that display an image from the server 101 changes, and the display size of the image window of the other client terminals changes unwillingly.

Hence, in order to solve these problems, the second embodiment is characterized in that the resizing processing in the server upon resizing of the image window is done in response to only a request from the client terminal which has acquired the camera control rights of that server. That is, upon resizing the image window shown in FIG. 4A, the client terminal transmits a resizing command to only the third server whose control rights it has acquired, and the client terminal itself executes resizing processing of images from other servers.

Note that a window that displays an image by the resizing processing of the server (i.e., an image from the server whose control rights are possessed by this client terminal) can be expressed clearly to the client terminal using a bold frame, as denoted by reference numeral 414 in FIG. 4B. In this way, a window that allows the resizing processing of the server of the plurality of display windows can be clarified, thus providing convenience in terms of system management such as management of the load on the client terminal and the like.

Figure 5:
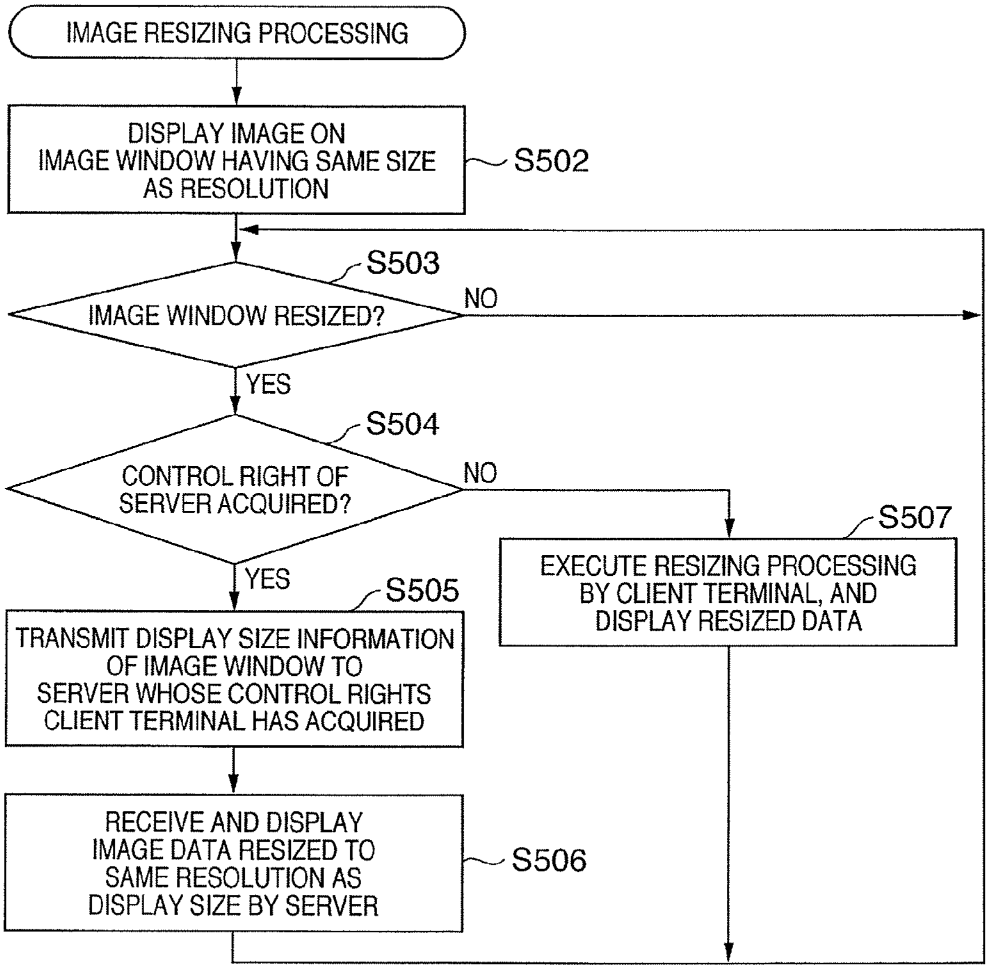
FIG. 5 is a flowchart showing the processing in the client terminal upon executing resizing processing in accordance with the camera control rights according to the second embodiment of the present invention.

FIG. 5 is a flowchart showing the processing in the client terminal upon executing the resizing processing in accordance with the camera control rights according to the second embodiment of the present invention. FIG. 5 explains the processing of the client terminal upon execution of resizing shown in FIG. 4B. Note that a program which implements this processing is stored in the memory 113*a* of the CPU 113, and is executed under the control of the CPU 113.

In step S502, the CPU 113 connects the four servers, and receives image data of the prescribed resolution. In the second embodiment, the CPU 113 receives image data of a resolution of 320×240 (pixels) distributed from the respective servers. The CPU 113 displays images from the respective servers on the image window having four areas each having a size that can display an image with a resolution of 320×240 (pixels) (FIG. 4A). The CPU 113 determines in step S503 whether or not a user resizes the image window. If the user resizes the image window, the process advances to step S504 to confirm if the client terminal has acquired the control rights of the server (network camera) corresponding to the resized image window. If the client terminal has acquired the control rights of that server, the process advances to step S505, and the CPU 113 transmits the display size information of the image window after resizing to the server (network camera) whose control rights the client terminal has acquired, i.e., the third server (not shown) in this embodiment.

In FIG. 4B, the size of the image window after resizing is 200 (pixels) in the horizontal direction×120 (pixels) in the vertical direction. Therefore, the CPU 113 transmits the display size information indicating 200×120 (pixels) to the third server. The third server changes the image sensing size in the image resizing unit 103 from 320×240 (pixels) to 200×120 (pixels) based on this display size information, and transmits that image data to the client terminal 111. In step S506, the client terminal 111 displays the received image stream transmitted from the server 101 as the image data of 200×120 (pixels).

On the other hand, for an image from the servers (network cameras) whose control rights the client terminal has not acquired in step S504, the client terminal itself executes resizing processing of the image from the servers and displays it. In the second embodiment, the client terminal 111 applies rendering processing such as sampling and the like to images from the servers other than the third server, and displays them in a reduced scale.

As described above, according to the second embodiment, upon changing the display size of the image window in the client terminal, only the client terminal which has acquired the control rights of the server can request resizing processing of an image to that server. Therefore, a situation in which a plurality of client terminals simultaneously request resizing processing to a single server can be avoided. Upon requesting the resizing processing from the client terminal to the server, priority can be given to a specific client terminal, i.e., the client acquires the control rights of the server.

On the client terminal, since the need for resizing processing for an image from the server whose control rights the client terminal has acquired can be obviated even when the client terminal displays a plurality of image windows, the processing load for resizing of the image on the client terminal can be reduced albeit slightly.

Third Embodiment

The third embodiment of the present invention will be described hereinafter with reference to FIGS. 6A to 10. Note that the hardware arrangements of the distribution system, server (network camera), and client terminal are the same as those of the first embodiment, and a description thereof will be omitted.

Figure 6A:
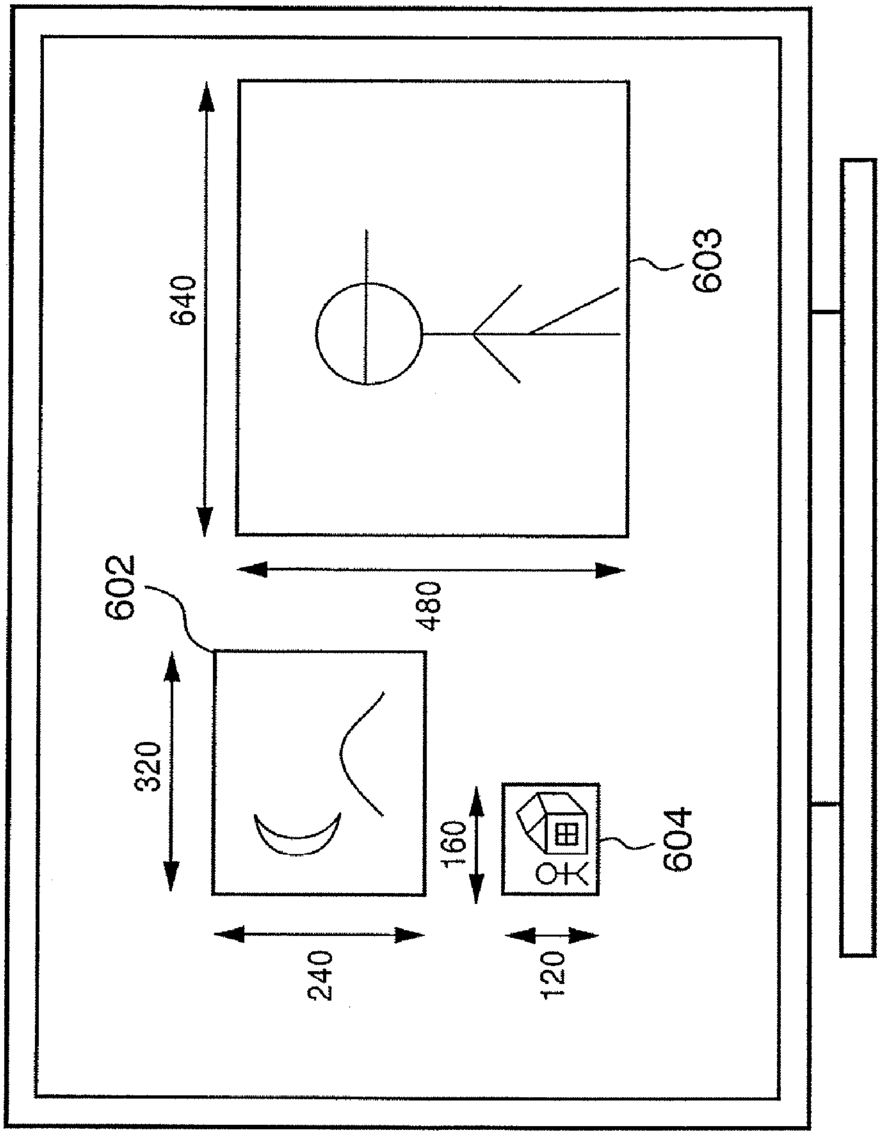
FIGS. 6A and 6B depict views illustrating windows displayed on the display of the client terminal according to a third embodiment.
Figure 6B:
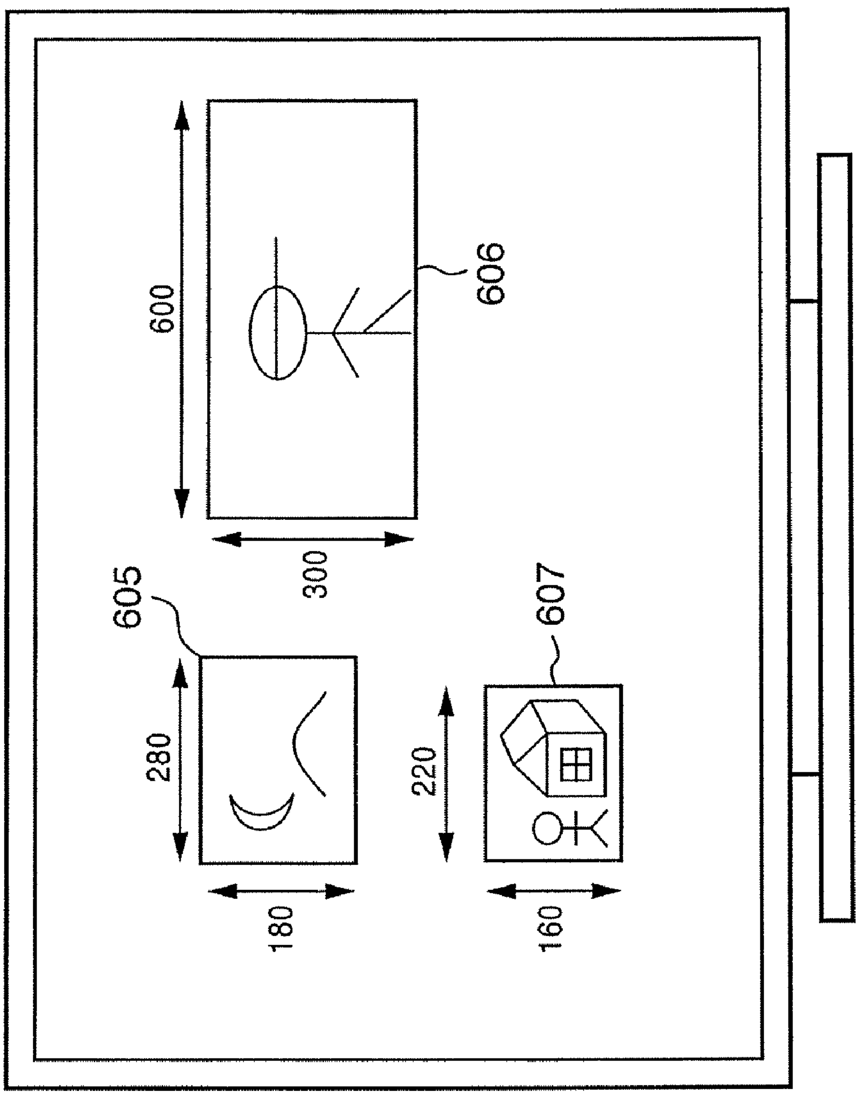

FIGS. 6A and 6B illustrate windows displayed on the display 114 of the client terminal according to the third embodiment. In FIGS. 6A and 6B, the client terminal simultaneously displays image data of three different resolutions distributed from three servers (not shown). Resizing of the image window will be described below.

FIG. 6A shows the display state on the display 114 before resizing. Reference numeral 602 denotes an mage window which displays image data of a resolution of 320×240 (pixels) transmitted from the first server. Reference numeral 603 denotes an image window which displays image data of a resolution of 640×480 (pixels) transmitted from the second server. Reference numeral 604 denotes an image window which displays image data of a resolution of 160×120 (pixels) transmitted from the third server. As described above, these image windows can be resized to arbitrary sizes by, e.g., dragging the mouse.

FIG. 6B shows the display contents on the display 114 after resizing of each image window by dragging of the mouse. Reference numeral 605 denotes an image window which displays image data after the client terminal executes the resizing processing of an image of the resolution of 320×240 (pixels) transmitted from the first server to a size of 280×180 (pixels). Likewise, reference numeral 606 denotes an image window which displays image data after the client terminal executes the resizing processing of an image of the resolution of 640×480 (pixels) transmitted from the second server to a size of 600×300 (pixels). Furthermore, reference numeral 607 denotes an image window which displays image data after the client terminal executes the resizing processing of an image of the resolution of 160×120 (pixels) transmitted from the third server to a size of 220×160 (pixels).

The third embodiment has as its object to reduce the load produced by such resizing processing of the client terminal. However, a reduction of the load need not be considered for a client terminal which has high processing performance with a sufficient margin for the load of the resizing processing. Therefore, whether or not the server executes resizing processing is determined based on the load state of the resizing processing in the client terminal, thus executing processing suited to the performance of the client terminal.

Figure 7:
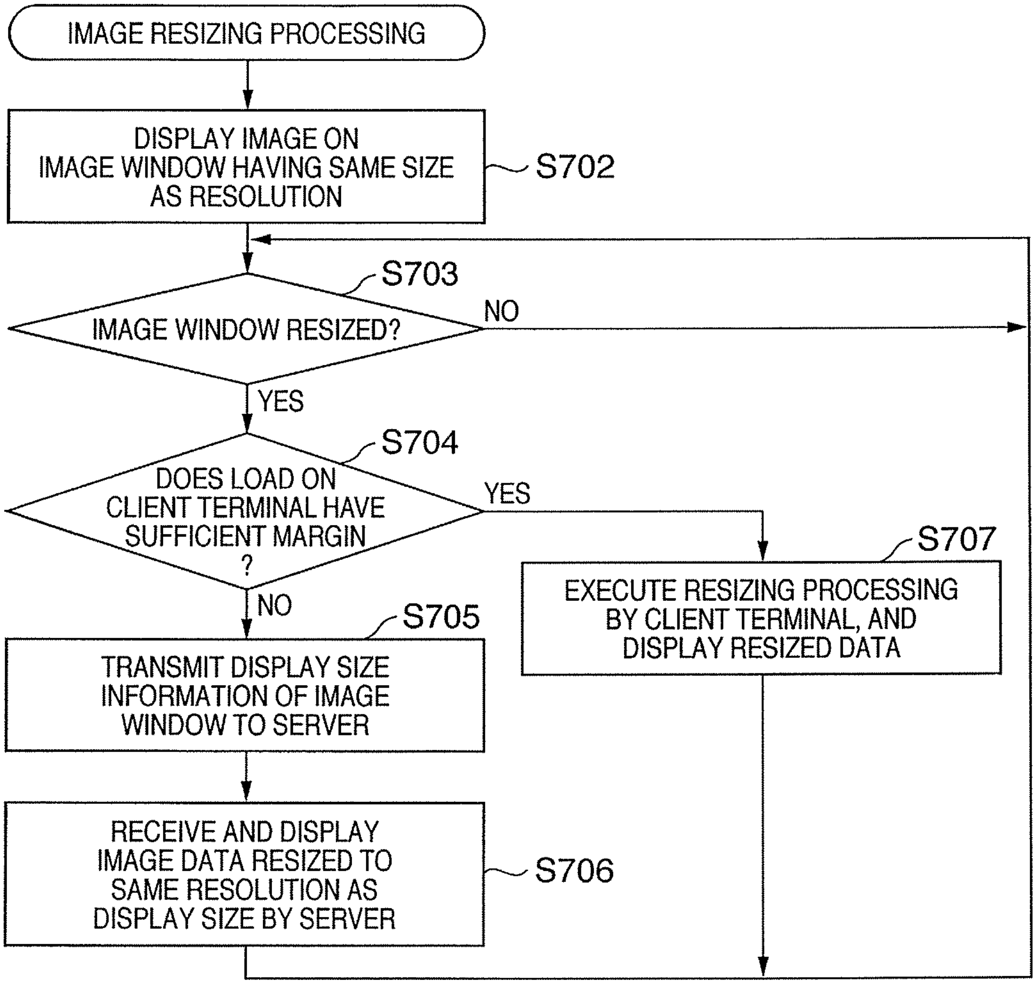
FIG. 7 is a flowchart showing the processing in the client terminal upon resizing processing of an image according to the third embodiment.

FIG. 7 is a flowchart showing the processing in the client terminal in the resizing processing of an image according to the third embodiment. In FIG. 7, whether or not the server executes resizing processing is determined based on the amount of load on the processing in the client terminal. FIG. 7 explains the processing of the client terminal upon resizing the image windows shown in FIG. 6B. Note that a program which implements this processing is stored in the memory 113*a* of the CPU 113, and is executed under the control of the CPU 113.

In step S702, the CPU 113 connects the three servers, and receives image data of the prescribed resolutions. In the third embodiment, the CPU 113 receives image data of 320×240 (pixels) from the first server, image data of 640×480 (pixels) from the second server, and 160×120 (pixels) from the third server. The CPU 113 then displays images from the respective servers on the image windows to have sizes corresponding to the respective sizes (FIG. 6A). The CPU 113 determines in step S703 whether or not a user resizes the image window. If the user resizes the window, the process advances to step S704 to confirm if the load of the resizing processing in the client terminal has a sufficient margin. If the load does not have any sufficient margin, the process advances to step S705, and the CPU 113 transmits the display size information of the image window to the server which transmits the image data to be resized. Then, the CPU 113 receives image data which has undergone the resizing processing by the server, and displays it on the resized image window in step S706. In this case, since the client terminal transmits the size information to only the server whose control rights the client terminal has acquired to make that server execute the resizing processing, the influence on other client terminals can be minimized.

On the other hand, if it is determined in step S704 that the load of the resizing processing in the client terminal has a sufficient margin, the process advances to step S707, and the client terminal executes the resizing processing of an image and displays the resized image since a reduction of the load on the client terminal need not be considered.

The method of determining the load on the resizing processing in the client terminal (S704) will be described below with reference to FIGS. 8 to 10.

The method of determining the load on the client terminal in step S704 can be attained using the amount of load on the client terminal, which is determined based on the image window size and whether or not the client terminal executes resizing processing. That is, a determining criterion is set based on the relationships that the load becomes heavier with increasing display size of the image window, and the load becomes heavy in the display size that requires the resizing processing in the client terminal.

FIG. 9 depicts an example of a table which stores the amounts of load on the client terminal in accordance with the display size. Note that this table is stored in the aforementioned memory 113*a*.

Reference numeral 901 denotes a display size D of an image window of the client terminal. Reference numeral 902 denotes the necessity/non-necessity of resizing processing in the client terminal. Since the display sizes (resolution) in the servers are 640×480 (pixels), 320×240 (pixels), and 160×120 (pixels), if the display size D is one of these display sizes, the need for the resizing processing in the client terminal is obviated (as shown "NOT NECESSARY"). Reference numeral 903 denotes an amount L of load on the client terminal. In the example of FIG. 9, when the display size is larger than 640×480 (pixels), since it is a nonstandard size, the resizing processing is "necessary", and the amount L of load assumes a maximum value "64". When the display size is equal to 640×480 (pixels), since it is a standard size, the resizing processing is "not necessary", and the amount L of load assumes "32" half the above amount of load. When the display size is smaller than 640×480 (pixels) and is larger than 320×240 (pixels), since it is a nonstandard size, the resizing processing is "necessary", and the amount L of load assumes a large value "48". Likewise, the "necessity/non-necessity" of the resizing processing is determined according to the display size, and the amount L of load is set accordingly.

Figure 8:
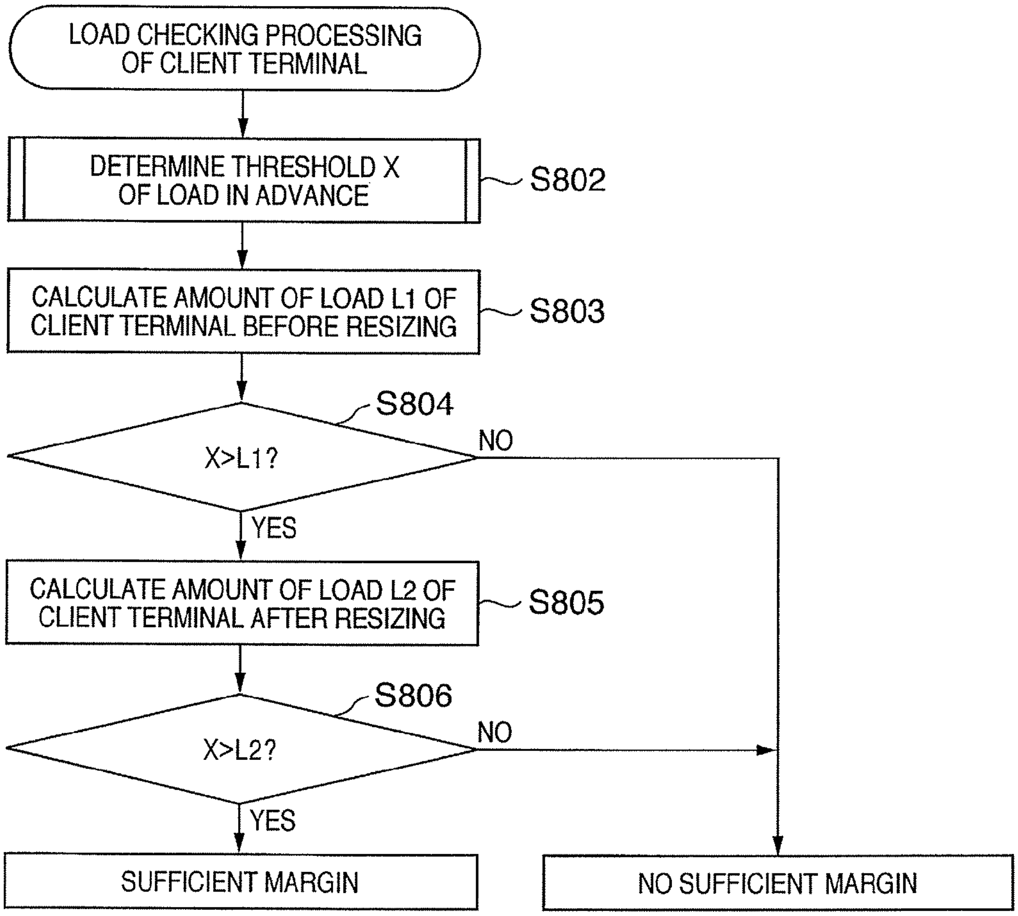
FIG. 8 is a flowchart showing the processing for checking a load on the client terminal based on an amount L of load calculated using a load table.

FIG. 8 is a flowchart showing the processing for determining the amount of load on the client terminal based on the amount L of load set using the table according to the third embodiment. For example, FIG. 8 explains the determining method upon execution of resizing shown in FIG. 6B. Note that a program which implements this processing is stored in the memory 113*a* of the CPU 113, and is executed under the control of the CPU 113.

In step S802, the CPU 113 determines a threshold X used to determine the presence/absence of a margin for the amount L of load obtained with reference to the table shown in FIG. 9. This threshold X is determined based on, e.g., the processing performance of the client terminal. For example, since a client terminal, which comprises a high-speed CPU, graphic card, and the like, has high performance with respect to the resizing processing, a large threshold X can be set. In the third embodiment, for example, the threshold X=50 is set.

In step S803, the CPU 113 calculates an amount L1 of load before resizing. In FIG. 6A of the third embodiment, the client terminal displays image windows having three sizes, i.e., 320×240 (pixels), 640×480 (pixels), and 160×120 (pixels). Since these sizes are the prescribed display sizes of the servers, no resizing processing on the client terminal is required. Therefore, the amount L1 of load calculated based on the table shown in FIG. 9 is 8+32+2=42. In step S804, the CPU 113 compares this amount L1 of load with the threshold X set in step S802. Since X (=50)>L1 (=42), it is determined that the processing of the client terminal has a sufficient margin, and the process advances to step S805, thus executing the resizing processing in the client terminal.

In step S805, the CPU 113 calculates an amount L2 of load after the resizing processing. In FIG. 6B of the third embodiment, the client terminal displays image windows of 280×180 (pixels), 600×300 (pixels), and 220×160 (pixels) after the resizing processing. None of these sizes correspond to the prescribed resolutions of the servers. For this reason, the resizing processing in the client terminal is required. In this case, the amount L2 of load determined based on the table in FIG. 9 is 12+48+12=72. In step S806, the CPU 113 compares this amount L2 (72) of load with the threshold X set in step S802. In this case, since X (=50)<L2 (=72), it is determined that the resizing processing in the client terminal does not have any sufficient margin. In such case, the CPU 113 notifies the servers of the display size information of the windows to issue a resizing request for the server.

On the other hand, if the amount L2 of load is smaller than the threshold X in step S806, it is determined that the resizing processing in this client terminal has a sufficient margin, thus executing the resizing processing by this client terminal.

In the flowchart shown in FIG. 8, a case has been explained wherein the amount L of load is calculated and determined as the determining method of the client terminal load. However, as another simple determining method, a method using an image frame rate is available.

Figure 10:
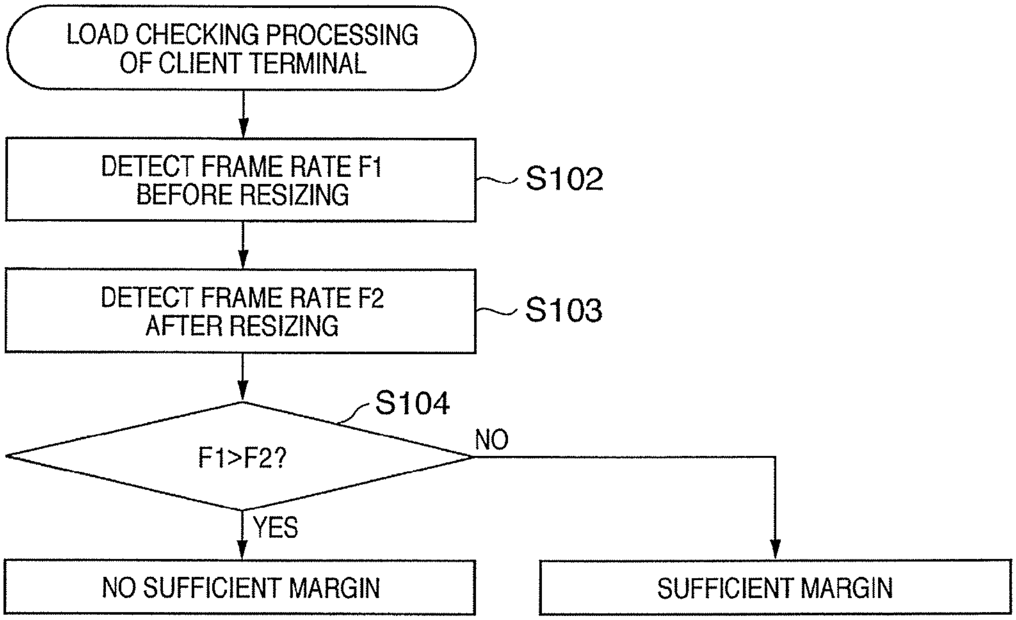
FIG. 10 is a flowchart sowing the load determination processing on the client terminal using an image frame rate as a checking criterion in a modification of the third embodiment.

FIG. 10 is a flowchart for explaining the load determining processing of the client terminal to have an image frame rate as a determining criterion according to a modification of the third embodiment of the present invention. Note that a program which implements this processing is stored in the memory 113*a* of the CPU 113, and is executed under the control of the CPU 113.

Referring to FIG. 10, the CPU 113 detects a frame rate value (F1) before resizing in step S102. For example, when a client terminal with high processing performance receives an image in the NTSC format, F1=30[frames/sec]. The CPU 113 detects a frame rate value (F2) after the image window is resized in step S103. In step S104, the CPU 113 compares the frame rate values before and after resizing of the image window. If F1=F2, it is determined that the processing of the client terminal has a sufficient margin.

On the other hand, if F1>F2 in step S104, since the load on the resizing processing of the client terminal becomes heavier, and the decode performance and rendering performance of image data have reached limits, a frame rate drop may occur. Therefore, in such case, the CPU 113 determines that the processing of the client terminal does not have any sufficient margin, and it notifies the server of display size information to issue a resizing request for the server.

As described above, according to the third embodiment, when the load on the processing of the client terminal becomes heavier upon changing the display size of the image window on the client terminal, the resizing processing in the server 101 is executed. In this way, appropriate resizing processing according to the processing performance of the client terminal can be executed.

In the third embodiment, the amount L of load and the frame rate value F based on the size of the image window have been exemplified as the load determining criteria on the client terminal. However, the present invention is not limited to them. For example, whether or not the use ratio of the CPU 113 of the client terminal reaches nearly 100% may be used as a determining condition. Hence, the present invention can be applied to various other load determining methods of the client terminal.

Fourth Embodiment

Figure 11:
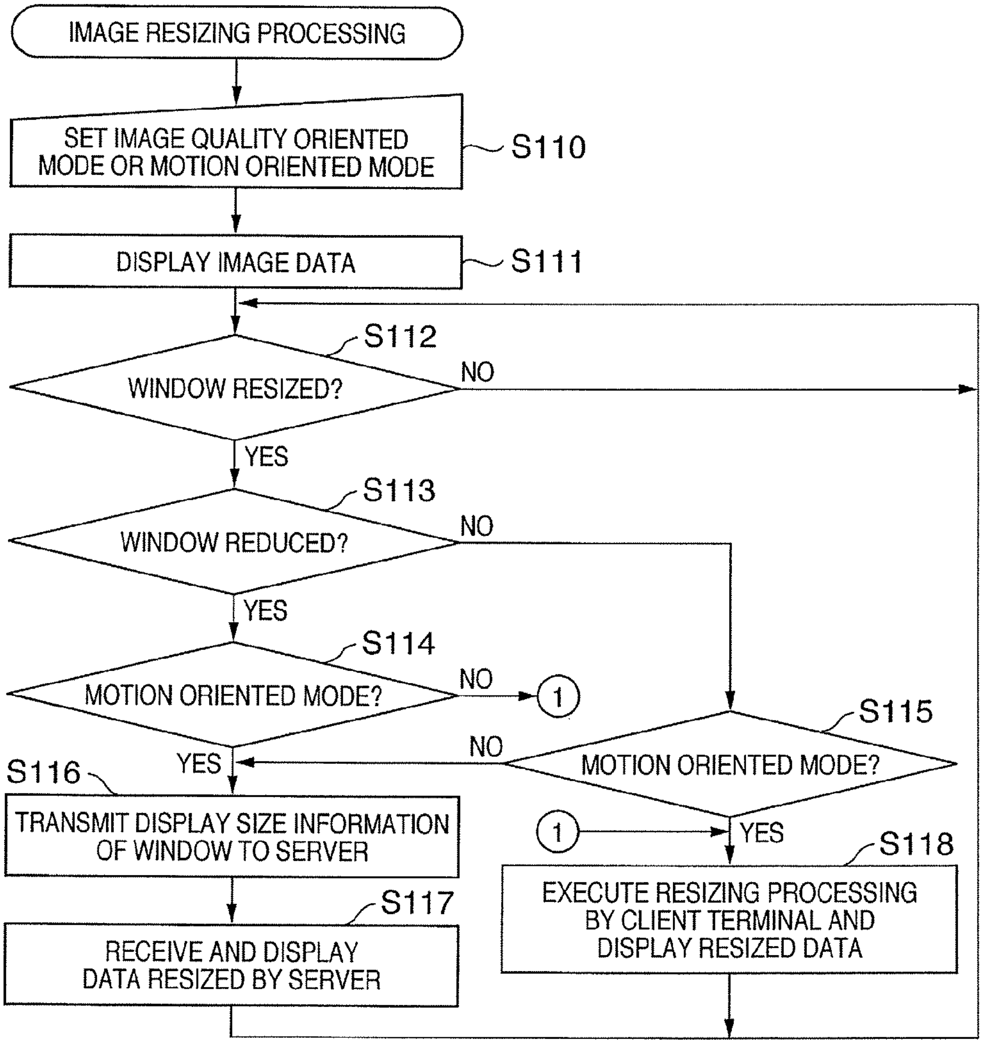
FIG. 11 is a flowchart for explaining the resizing processing in an image distribution system according to a fourth embodiment of the present invention.

FIG. 11 is a flowchart for explaining the processing for executing resizing processing in an image distribution system according to the fourth embodiment of the present invention. This embodiment will explain the processing of the client terminal upon resizing the window, as shown in FIG. 2B, in a system which can select two modes, i.e., an image quality oriented mode and motion oriented mode with respect to the quality of an image. Note that a program which implements this processing and the setting state of the operation mode are stored in the memory 113*a* of the CPU 113, and is executed under the control of the CPU 113. Also, since the system and apparatus arrangements according to the fourth embodiment are the same as those in the first embodiment described above, a description thereof will be omitted.

In step S110, the CPU 113 prompts a user to select one of the image quality oriented mode and motion oriented mode, and sets the selected mode. The process advances to step S111, and the CPU 113 connects the server 101 via the network 121 to receive and display image data of the prescribed resolution. In the fourth embodiment, assume that the client terminal receives and displays image data of a resolution of, e.g., 640×480 (pixels) (FIG. 2A). The process then advances to step S112 to determine whether or not a user resizes the image window, as described above using FIG. 2B. If it is determined that the user resizes the window, the process advances to step S113 to determine whether the user reduces or enlarges the image window.

If it is determined that the user reduces the image window, the process advances to step S114 to identify the operation mode set in step S110. If the motion oriented mode is set, the process advances to step S116, and the CPU 113 transmits the display size information of the image window 212 after resizing to the server 101 via the communication I/F unit 112. In the fourth embodiment, assume that the window size after resizing is 512 (pixels) in the horizontal direction×384 (pixels) in the vertical direction, as shown in FIG. 2B above. In this case, the CPU 113 transmits the display size information indicating 512×384 (pixels) to the server 101 in step S116. In this way, the server 101 changes the image sensing size (resolution) from 640×480 (pixels) to 512×384 (pixels) based on the received size information, and transmits that image data to the client terminal 111. In step S117, the client terminal 111 displays the received image stream transmitted from the server 101 as the image data of 512×384 (pixels).

On the other hand, if it is determined in step S114 that the operation mode is the image quality oriented mode, the process advances to step S118. In step S118, the client terminal 111 resizes data of 640×480 (pixels) to that of 512×384 (pixels) by re-sampling processing, and displays the resized data.

If the user enlarges the image window from 640×480 (pixels) to, e.g., 700×500 (pixels) in step S113, the process advances to step S115 to determine the set operation mode. If the operation mode is the motion oriented mode, the process advances to step S118. In step S118, the client terminal 111 resizes data of 640×480 (pixels) to that of 700×500 (pixels) by interpolation processing, and displays the resized data. On the other hand, if the operation mode is the image quality oriented mode in step S115, the process advances to step S116 as in the above case, and the CPU 113 transmits the display size information indicating 700×500 (pixels) to the server 101. In this way, in step S117, the client terminal 111 receives and displays image data of 700×500 (pixels) which has undergone the resizing processing in the server 101.

As described above, according to the fourth embodiment, whether the server or client terminal executes the resizing processing can be selected and determined in accordance with the operation mode of the client terminal and the resizing operation of the window.

FIG. 12 shows an example of the relationship among the operation mode, the window resize state, and the resizing processing according to the fourth embodiment.

In this case, whether or not the server or client terminal performs execution of resizing processing denoted by reference numeral 1203 can be selected in accordance with four different conditions of an operation mode 1201 of the client terminal and a resize state 1202 of the image window. Under the four different conditions shown in FIG. 12, the resizing processing is done according to the following reasons. Respective cases 1210-1213 shown in FIG. 12 will be described below.

(1) Case 1210: Upon enlarging the window in the image quality oriented mode, the resolution of image data must be increased in accordance with the enlarged window size to assure high image quality. Therefore, the server executes the resizing processing.

(2) Case 1211: Upon reducing the window in the image quality oriented mode, since the resolution of image data is equal to or higher than the reduced window size, image quality can be assured by only re-sampling by the client terminal. Therefore, the client terminal executes the resizing processing.

(3) Case 1212: Upon enlarging the window in the motion oriented mode, the data size must not be increased so as to prevent a frame rate drop resulting from a limitation of a line transmission capacity. Therefore, the client terminal executes the resizing processing.

(4) Case 1213: Upon reducing the window in the motion oriented mode, the data size is reduced by setting the same resolution as that of the reduced window size, thus assuring a frame rate. Therefore, the server executes the resizing processing.

Note that the fourth embodiment has exemplified combinations of the image quality oriented mode and motion oriented mode as the conditions of the operation modes, and enlargement and reduction of the window. However, the present invention is not limited to this. For example, whether the client terminal or server executes resizing processing may be determined to have, e.g., a scheduling event or external sensor event as a trigger.

Fifth Embodiment

The fifth embodiment of the present invention will be described hereinafter with reference to FIGS. 13 and 14. Since the system and apparatus arrangements according to the fifth embodiment are the same as those in the above embodiments, a description thereof will be omitted.

As has been described in the above embodiments, upon changing the size of the window to be displayed on the client terminal 111 under predetermined conditions, the client terminal 111 transmits information associated with the changed display size to the server 101. Based on this information, the server 101 changes the resolution of an image to be captured by the image resizing unit 103 to have a resolution according to the display size, and transmits image data whose resolution has been changed to the client terminal 111. In this way, the load of the resizing processing on the client terminal 111 can be reduced.

On the other hand, the amount of image data changes after the resizing processing in the server 101 according to the window size. If the amount of image data increases, it may exceed the allowable amount of data of that line depending on the network involved, or it may occupy most of the allowable amount of data of the line. To solve such problem, upon changing the window size on the client terminal 111, whether the client terminal 111 or the server 101 executes resizing processing is selected in accordance with the line transmission capacity and line quality used, thus allowing resizing processing suited to the system environment.

Figure 13:
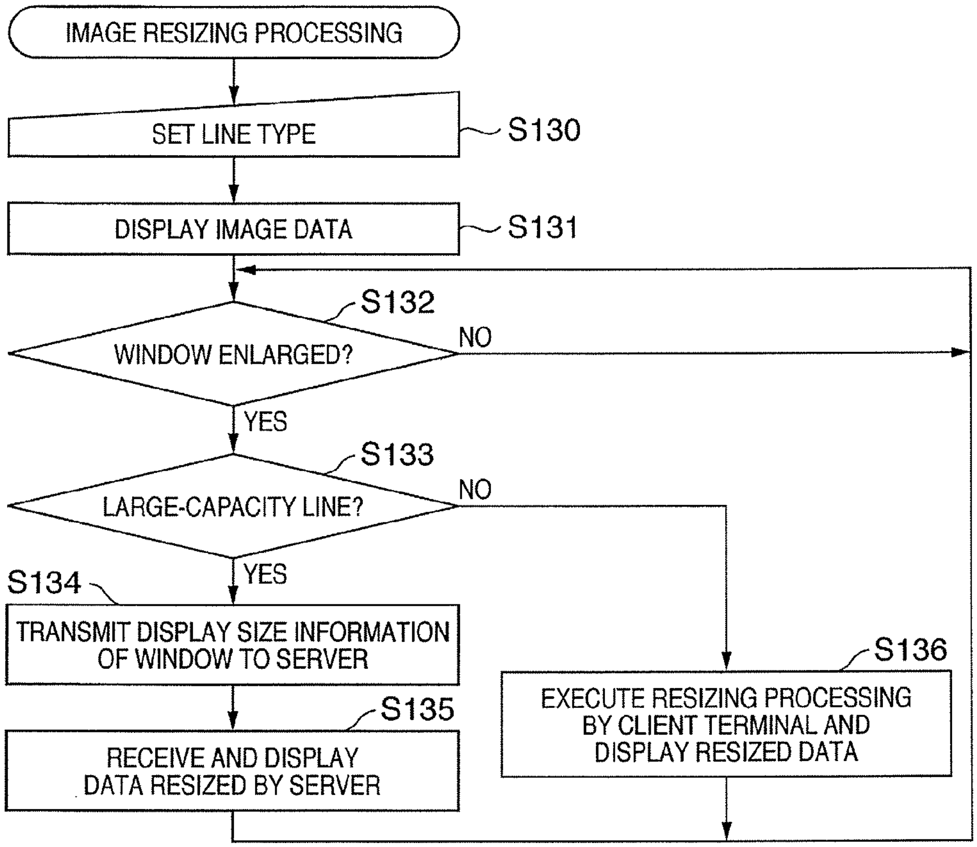
FIG. 13 is a flowchart for explaining the resizing processing when an image window is enlarged in an image distribution system according to a fifth embodiment.

FIG. 13 is a flowchart for explaining resizing processing upon enlarging the image window in an image distribution system according to the fifth embodiment. Note that a program which implements this processing and the setting state of the operation mode are stored in the memory 113*a* of the CPU 113, and is executed under the control of the CPU 113. Also, since the system and apparatus arrangements according to the fifth embodiment are the same as those in the first embodiment described above, a description thereof will be omitted. The following description will be given for a system which can select two lines including FTTH connection, i.e., a large-capacity line, and PPP connection, i.e., a small-capacity line as the types of lines.

In step S130, a user selects and sets one of the FTTH connection and PPP connection. In step S131, the CPU 113 connects the server 101 via the network 121, and receives and displays image data of the prescribed resolution. In the fifth embodiment, assume that the client terminal receives and displays image data of a resolution of, e.g., 640×480 (pixels) (FIG. 2A). The process then advances to step S132 to determine whether the user enlarges the image window on the client terminal 111. If the user enlarges the window, the process advances to step S133 to determine the set line type. If the FTTH connection, i.e., the large-capacity line is set, the process advances to step S134, and the CPU 113 transmits the display size information of the enlarged image window to the server 101 via the communication I/F unit 112.

In the fifth embodiment, assume that the window size after resizing is, e.g., 1920 (pixels) in the horizontal direction× 1080 (pixels) in the vertical direction.

In this way, in step S134 the CPU 113 transmits the display size information indicating 1920×1080 (pixels) to the server 101. Based on the received display size information, the server 101 changes the image sensing size (resolution) from 640×480 (pixels) to 1920×1080 (pixels), and transmits image data captured using the changed size to the client terminal 111. The process then advances to step S135, and the client terminal 111 displays the received image stream transmitted from the server 101 as the image data of 1920×1080 (pixels).

On the other hand, if the line type is the PPP connection, i.e., the small-capacity line in step S133, the process advances to step S136. In step S136, the client terminal 111 resizes data of 640×480 (pixels) to that of 1920×1080 (pixels) by interpolation processing, and displays the resized data.

As described above, according to the fifth embodiment, upon enlarging the window in case of the small-capacity line, the client terminal executes resizing processing so as to prevent the amount of image data transmitted through the line from increasing. In this way, appropriate resizing processing according to the line transmission capacity can be done.

Note that the fifth embodiment has exemplified the line types as setting items of the client terminal. However, the present invention is not limited to this.

FIG. 14 shows an example of the relationship between the setting items of the client terminal and the resizing processing.

In the aforementioned fifth embodiment, whether the client terminal 111 or server 101 executes resizing processing is determined according to a line condition 1401. Like in the line condition 1401, whether the client terminal 111 or server 101 executes resizing processing can be determined according to the following conditions.

(1) "Performance" 1402 is an item example associated with the operation performance of the client terminal 111. When the client terminal 111 is in a power saving mode, the server 101 executes resizing processing to reduce the load on the resizing processing in the client terminal 111.

(2) "Model" 1403 is an item example associated with the model of the client terminal 111. When the client terminal 111 is a cellular phone, since it has low processing performance, the server 101 executes resizing processing.

(3) "Function" 1404 is an item example associated with the application function of the client terminal 111. When the client terminal 111 is recording an image, since the load on the client terminal 111 becomes heavier, the server 101 executes resizing processing.

(4) "Quality" 1405 is an item example associated with the quality of an image to be displayed on the client terminal 111. When the client terminal 111 requires a high-quality image, since an image with the same resolution as that of the image window is required, the server 101 executes resizing processing.

The conditions that the watcher can be set, and the environmental conditions of a supervising system are not limited to such specific conditions. Whether the client terminal or server executes resizing processing may be determined to have a scheduling event or external sensor event as a trigger. In this way, the example of the present invention can be applied to various other conditions. The supervising system has various environmental conditions, and where the resizing processing is executed may be determined according to these conditions.

Other Embodiments

The preferred embodiments of the present invention have been explained, and the present invention can be applied to either an image distribution system constituted by a plurality of devices, or an image distribution apparatus consisting of a single equipment.

Note that the present invention can be achieved by directly or remotely supplying a program that implements the functions of the aforementioned embodiments to a system or apparatus, and reading out and executing the supplied program code by a computer of that system or apparatus. In the above embodiments, such programs correspond to the flowcharts shown in FIGS. 3, 5, 7-8, 10-11 and 13. In this case, the form of program is not particularly limited as long as it has a program function. Therefore, the program code itself installed in a computer to implement the functional processing of the present invention using the computer achieves the present invention. In this case, the form of program is not particularly limited, and an object code, a program to be executed by an interpreter, script data to be supplied to an OS, and the like may be used as along as they have the functions of the program.

Various recording media for supplying the program can be used. For example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like can be used.

As another program supply method, the program may be supplied by establishing connection to a home page on the Internet using a browser on a client computer, and downloading the program from the home page onto a recording medium such as a hard disk or the like. In this case, the program to be downloaded includes the computer program itself of the present invention or a compressed file including an automatic installation function. Also, the program code that forms the program of the present invention may be segmented into a plurality of files, which may be downloaded from different home pages. That is, the claims of the present invention include a WWW server which makes a plurality of users download program files required to implement the functional processing of the present invention by the computer.

Also, a storage medium such as a CD-ROM or the like, which stores the encrypted program of the present invention, may be delivered to the user. In this case, the user who has cleared a predetermined condition may be allowed to download key information used to decrypt the encrypted program from a home page via the Internet, and the program encrypted using that key information may be installed in a computer in an executable form.

The present invention can be implemented in a mode other than the mode for implementing the functions of the aforementioned embodiments by executing the readout program code by the computer. For example, the functions of the aforementioned embodiments can also be implemented by some or all of actual processing operations executed by an OS or the like running on the computer on the basis of an instruction of that program.

Furthermore, the program read out from the recording medium may be written in a memory of an extension board or a function extension unit, which is inserted in or connected to the computer. In this case, the functions of the aforementioned embodiments are implemented by some or all of actual processes executed by a CPU or the like arranged in the function extension board or unit.

As described above, according to the above embodiments, the load on the resizing processing in the client terminal can be reduced.

Also, deterioration of image quality due to a resizing instruction at the client terminal can also be prevented.

By limiting a client terminal which is permitted to request resizing processing in the server, simultaneous requests from a plurality of client terminals to the server can be avoided.

Since the necessity/non-necessity of resizing processing in the server is determined according to the amount of load of the resizing processing in the client terminal, the load on the resizing processing in the server can be reduced, and the system load can be appropriately distributed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Applications No. 2005-314844 filed Oct. 28, 2005 and Japanese Patent Applications No. 2006-220639 filed Aug. 11, 2006, which are hereby incorporated by reference herein in their entirety.

What is claimed is:

1. An image distribution system for transmitting image data captured by a camera unit at a predetermined resolution from a server to a client terminal, and displaying the image data on the client terminal, wherein the client terminal comprises:

a notification unit configured to notify the server of size information of a window for displaying the image data and whose size has been changed in accordance with a size change instruction;

a display control unit configured to control to display the image data received from the server on the window, a first resizing unit configured to change a display size of the image data in the client terminal based on a size of a window for displaying the image data and the size of which has been changed in accordance with the size change instruction;

a first determination unit configured to determine, based on a load state of processing in the client terminal and whether or not the client terminal has a control right for changing the capturing direction of the camera unit, whether or not to request the server to execute resizing processing of the image data in accordance with the size change instruction; and a first unit configured to, in a case that the first determination unit determines not to request the server to execute the resizing processing, control the first resizing unit to resize the image data;

wherein the server comprises:

a second resizing unit configured to change a resolution upon capturing the image data based on the size information in response to the notification by the notification unit, wherein the display control unit of the client terminal receives the image data resized by the second resizing unit and displays the received image data on the window, in a case that the first determination unit determines to request the server to execute the resizing processing, and the display control unit displays the image data resized by the first resizing unit on the window, in a case that the first determination unit determines not to request the server to execute the resizing processing.

2. The system according to claim 1, wherein when the first determination unit determines that the load state of processing in the client terminal is not lower than a predetermined load state and determines that the client terminal has the control right for changing the capturing direction of the camera unit, the first determination unit determines to request the server to execute resizing processing of the image data and the notification unit notifies the server of display size information of the changed window, and wherein when the first determination unit determines that the load state of processing in the client terminal is lower than the predetermined load state or determines that the client terminal does not have the control right changing the capturing direction of the camera unit, the first determination unit determines not to request the server to execute resizing processing of the image data and the notification unit does not notify the server of the display size information of the changed window.

3. The system according to claim 1, further comprising a calculation unit configured to calculate the load state based on the size of the window and the resolution of the image data.

4. The system according to claim 1, further comprising a calculation unit configured to calculate the load state based on frame rates before and after the change instruction.

5. The system according to claim 1, further comprising:

a setting unit configured to set at least one of an operation condition of the client terminal that receives the image data and an environment condition specific to the system, wherein the environment condition is related to the client terminal, a communication apparatus including the server and a communication line of the system, wherein the first determination unit determines based on the condition set by the setting unit whether or not to request the server to execute resizing processing of the image data corresponding to the size change instruction.

6. The system according to claim 5, wherein the operation condition is associated with image quality upon displaying the image data in the client terminal.

7. The system according to claim 5, wherein the operation condition is associated with an image frame rate upon displaying the image data in the client terminal.

8. The system according to claim 5, wherein the operation condition is associated with recording of the image data on a storage media of the client terminal or the server.

9. The system according to claim 5, wherein the operation condition is associated with a consumption power of a communication apparatus which forms the client terminal.

10. The system according to claim 5, wherein the environment condition is associated with a transmission capacity and transmission quality of the communication line that connects the client terminal with the server.

11. The system according to claim 5, wherein the environment condition is associated with a performance of a communication apparatus that constitutes the client terminal or the server.

12. The system according to claim 1, further comprising:

a second determination unit configured to determine whether or not to cause the server to execute resizing processing of the image data in accordance with the size change instruction, based on whether the size of the window is enlarged or reduced; and a second unit configured to cause the first resizing unit to execute resizing of the image data in a case that the second determination unit determines not to request the server to execute the resizing processing, wherein the notification unit notifies the server of size information of the window which has been changed in accordance with the size change instruction, in a case that the second determination unit determines to cause the server to execute the resizing processing, and the display control unit controls to display the image data received from the server, or the image data resized by the first resizing unit, on the window.

13. The system according to claim 1, wherein the first determination unit determines whether or not to request the server to execute resizing processing of the image data, based on the load state of processing in the client terminal and whether or not the client terminal has the control right for changing the capturing direction of the camera unit corresponding to the image data whose size has been changed in accordance with the size change instruction.

14. The system according to claim 1, wherein the server is a network camera for capturing image data.

15. A client terminal for receiving image data captured by a camera unit at a predetermined resolution from a server, and displaying the received image data on a window, comprising:

a notification unit configured to notify the server of size information of a window which displays the image data and a size of which has been changed in accordance with a size change instruction;

a display control unit configured to receive the image data resized by the server, and displaying the resized image data on the window;

a resizing unit configured to change a display size of the image data based on the size of the window has been changed in accordance with the size change instruction;

a determination unit configured to determine, in accordance with a load state of processing of the client terminal and whether or not the client terminal has a control right for changing the capturing direction of the camera unit, whether or not to request the server to execute resizing processing of the image data corresponding to the size change instruction; and a control unit configured to, in a case that the determination unit determines not to request the server to execute the resizing processing, control the resizing unit to resize the image data, wherein the notification unit notifies the server of display size information of the window which has been changed in accordance with the size change instruction, in a case that the determination unit determines to request the server to execute the resizing processing, and the display control unit displays the image data resized by the resizing unit on the window, in a case that the determination unit determines not to request the server to execute the resizing processing.

16. The terminal according to claim 15, wherein, when the determination unit determines that the load state of processing in the client terminal is not lower than a predetermined load state and determines that the client terminal has the control right for changing the capturing direction of the camera unit, the determination unit requests the server to execute resizing processing of the image data and the notification unit notifies the server of display size information of the changed window, and wherein when the first determination unit determines that the load state of processing in the client terminal is lower than the predetermined load state or determines that the client terminal does not have the control right for changing the capturing direction of the camera unit, the determination unit determines not to request the server to execute resizing processing of the image data and the notification unit does not notify the server of the display size information of the changed window.

17. The terminal according to claim 15, further comprising a calculation unit configured to calculate the load state based on the size of the window and the resolution of the image data.

18. The terminal according to claim 15, further comprising a calculation unit configured to calculate the load state based on frame rates before and after the size change instruction.

19. The client terminal according to claim 15, wherein the server is a network camera for capturing image data.

20. A method of controlling an image distribution system for transmitting image data captured by the camera unit at a predetermined resolution from a server to a client terminal, and displaying the image data on the client terminal, comprising:

an input step of inputting a change instruction of a size of a window which displays the image data;

a notification step of notifying the server of size information of the window the size of which has been changed in accordance with a size change instruction;

a first resizing step of causing the server to change a resolution upon capturing the image data based on the size information;

a display control step of causing the client terminal to receive the image data resized in the first resizing step and displaying the resized image data on the window;

a second resizing step of causing the client terminal to change a display size of the image data based on a size of a window which has been changed in accordance with the size change instruction;

a first determination step of determining, based on a load state of processing in the client terminal and whether or not the client terminal has a control right for changing the capturing direction of the camera unit, whether or not to request the server to execute the resizing processing of the image data corresponding to the size change instruction; and a step of controlling, in a case that it is determined in the first determination step not to request the server to execute the resizing processing, the second resizing step to cause the client terminal to resize the image data, and in a case that it is determined in the first determination step to request the server to execute the resizing processing, the notification step to notify the server of information of the window size which has been changed in accordance with the size change instruction, and the display control step causes the client terminal to display the image data resized by the server.

21. The method according to claim 20, wherein when it is determined in the first determination step that the load state of processing in the client terminal is not lower than a predetermined load state and that the client terminal has the control right for changing the capturing direction of the camera unit, it is determined in the first determination step to request the server to execute resizing processing of the image data and the display size information of the changed window is notified to the server in the notification step and, wherein when it is determined in the first determination step that the load state of processing in the client terminal is lower than a predetermined load state or that the client terminal does not have the control right for changing the capturing direction of the camera unit, it is determined in the first determination step not to request the server to execute resizing processing of the image data and the display size information of the changed window is not notified to the server.

22. The method according to claim 20, further comprising a calculation step of calculating the load state of the client terminal based on the size of the window and the resolution of the image data.

23. The method according to claim 20, further comprising a calculation step of calculating the load state of the client terminal based on frame rates before and after the size change instruction.

24. The method according to claim 20, further comprising:

a setting step of setting at least one of an operation condition of the client terminal that receives the image data and an environment condition specific to the system, wherein the environment condition is related to the client terminal, a communication apparatus including the server and a communication line of the system, wherein it is determined in the first determination step based on the condition set in the setting step whether to request the server to execute the resizing processing of the image data corresponding to the size change instruction, or to cause the client terminal to execute the resizing processing in the second resizing step.

25. The method according to claim 20, further comprising:

a second determination step of determining, depending on whether the size of the window is enlarged or reduced in the input step, whether or not to request the server to execute resizing processing of the image data corresponding to the size change instruction; and a step of controlling, in a case that it is determined in the second determination step not to request the server to execute the resizing processing, the second resizing step to resize the image data, wherein in a case that it is determined in the second determination step to request the server to execute the resizing processing, the notification step notifies the server of information of the window size which has been changed in accordance with the size change instruction, and in the display control step, the image data resized by the server or the image data resized in the second resizing step is displayed on the window.

26. The method according to claim 20, wherein the server is a network camera for capturing image data.

27. An image distribution system for transmitting image data captured by a camera unit at a predetermined resolution from a server to a client terminal, and displaying the image on the client terminal, wherein the client terminal comprises:

a notification unit configured to notify the server of size information of a window for displaying the image and whose size has been changed in accordance with a size change instruction;

a display control unit configured to control to display an image on the window in accordance with image data from the server on the window, a first resizing unit configured to change a display size of the image in the client terminal based on a size of a window for displaying the image and the size of which has been changed in accordance with the size change instruction;

a determination unit configured to determine, based on whether or not the client terminal has a control right for changing the capturing direction of the camera unit corresponding to the image whose size has been changed in accordance with the size change instruction, whether or not to request the server to execute resizing processing of the image data in accordance with the size change instruction; and a control unit configured to, in a case that the determination unit determines not to request the server to execute the resizing processing, control the first resizing unit to resize the image data;

wherein the server comprises:

a second resizing unit configured to change a resolution upon capturing the image data based on the size information in response to the notification by the notification unit, wherein the display control unit of the client terminal receives the image data resized by the second resizing unit and displays the image on the window according to the received image data, in a case that the determination unit determines to request the server to execute the resizing processing, and the display control unit displays the image on the window according to the image data resized by the first resizing unit, in a case that the determination unit determines not to request the server to execute the resizing processing.

28. The system according to claim 27, wherein the display control unit controls to display plural images on the window in accordance with image data from plural servers, each of the plural servers having a camera unit, the determination unit determines, based on whether or not the client terminal has the control right for changing the capturing direction of each of the plural camera units, whether or not to request each of the plural servers to execute resizing processing of the image data corresponding to each of the plural servers, in accordance with the size change instruction;

the first resizing unit changes a display size of an image corresponding to the image data from a server which is determined by the determination unit not to request to execute resizing processing, the display control unit of the client terminal receives the image data resized by the first resizing unit and displays the image in accordance with the received image data on the window, and the display control unit of the client terminal receives image data resized by the second resizing unit of a server which is determined by the determination unit to request to execute resizing processing, and displays an image in accordance with the received image data on the window.

29. The system according to claim 27, wherein the server is a network camera for capturing image data.

30. A client terminal for receiving image data captured by a camera unit at a predetermined resolution from a server, and displaying the received image data on a window, comprising:

a notification unit configured to notify the server of size information of a window for displaying the image data and whose size has been changed in accordance with a size change instruction;

a display control unit configured to control to display the image on the window in accordance with the image data from the server;

a resizing unit configured to change a display size of the image based on a size of a window has been changed in accordance with the size change instruction;

a determination unit configured to determine, based on whether or not the client terminal has a control right for changing the capturing direction of the camera unit corresponding to the image data whose size has been changed in accordance with the size change instruction, whether or not to request the server to execute resizing processing of the image data in accordance with the size change instruction;

a control unit configured to, in a case that the determination unit determines not to request the server to execute the resizing processing, control the first resizing unit to resize the image data, wherein the notification unit notifies the server of display size information of the window which has been changed in accordance with the size change instruction, in a case that the determination unit determines to request the server to execute the resizing processing, and the display control unit displays the image on the window in accordance with the image data resized by the resizing unit, in a case that the determination unit determines not to request the server to execute the resizing processing.

31. The client terminal according to claim 30, wherein the display control unit controls to display plural images on the window in accordance with image data from plural servers, each of the plural servers having a camera unit, the determination unit determines, based on whether or not the client terminal has the control right for changing the capturing direction of each of the plural camera units, whether or not to request each of the plural servers to execute resizing processing of the image data in accordance with the size change instruction for changing the size of the window for displaying the plural images, the resizing unit changes a display size of images corresponding to the image data from the plural servers, in a case that the determination unit determines not to request the each of the plural servers to execute resizing processing, the display control unit of the client terminal receives the image data resized by the resizing unit and displays the image in accordance with the received image data on the window, and the notification unit notifies a server which is determined by the determination unit to request to execute resizing processing, display size information of the window whose size has been changed in accordance with the size change instruction.

* * * * *